United States Patent
Jin

(10) Patent No.: US 9,207,922 B2
(45) Date of Patent: Dec. 8, 2015

(54) COMPILING METHOD AND APPARATUS FOR SCHEDULING BLOCK IN PIPELINE

(71) Applicant: SAMSUNG ELECTRONICS CO., LTD., Suwon-si (KR)

(72) Inventor: Taisong Jin, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/134,517

(22) Filed: Dec. 19, 2013

(65) Prior Publication Data

US 2014/0215448 A1    Jul. 31, 2014

(30) Foreign Application Priority Data

Jan. 28, 2013    (KR) .................. 10-2013-0009058

(51) Int. Cl.
*G06F 9/45*    (2006.01)

(52) U.S. Cl.
CPC .............. *G06F 8/443* (2013.01); *G06F 8/4451* (2013.01)

(58) Field of Classification Search
CPC .......................................... G06F 8/445–8/447
USPC .................................................. 717/136–167
See application file for complete search history.

(56) References Cited

U.S. PATENT DOCUMENTS

| | | | |
|---|---|---|---|
| 5,222,240 A * | 6/1993 | Patel .............................. | 712/218 |
| 5,553,256 A * | 9/1996 | Fetterman et al. ............ | 712/217 |
| 5,604,878 A * | 2/1997 | Colwell et al. ................ | 712/217 |
| 6,092,180 A * | 7/2000 | Anderson et al. ............. | 712/200 |
| 6,112,317 A | 8/2000 | Berc et al. | |
| 6,139,199 A * | 10/2000 | Rodriguez ..................... | 717/159 |
| 6,260,189 B1 * | 7/2001 | Batten et al. .................. | 717/151 |
| 6,862,677 B1 * | 3/2005 | Stravers ........................ | 712/218 |
| 7,949,855 B1 * | 5/2011 | Mills et al. .................... | 712/214 |
| 8,315,995 B1 * | 11/2012 | Levy .............................. | 707/694 |
| 8,560,813 B2 * | 10/2013 | Webber ......................... | 712/219 |
| 2005/0210471 A1 | 9/2005 | Okawara | |

FOREIGN PATENT DOCUMENTS

| | | |
|---|---|---|
| JP | 2003-131888 A | 5/2003 |
| JP | 2003-140910 A | 5/2003 |
| KR | 10-2007-0116848 A | 12/2007 |
| KR | 10-2008-0087171 A | 9/2008 |
| KR | 10-2009-0132633 A | 12/2009 |

(Continued)

OTHER PUBLICATIONS

Chen, Tien-Fu, and Jean-Loup Baer. Reducing memory latency via non-blocking and prefetching caches. vol. 27. No. 9. ACM, 1992, pp. 1-22.*

(Continued)

*Primary Examiner* — Satish Rampuria
(74) *Attorney, Agent, or Firm* — Sughrue Mion, PLLC

(57) ABSTRACT

Provided is a compiling method and apparatus for scheduling a block in a pipeline. The compiling method for scheduling a block in a pipeline may include profiling, using a processor, an access count of a block in a control flow of a program code, determining that the block is an important block, in response to an edge count of an edge entering the block being greater than or equal to a predetermined value, the edge count being included in the access count of the block, and scheduling the important block based on the access count to prevent a register writeback conflict.

18 Claims, 18 Drawing Sheets

(56) References Cited

FOREIGN PATENT DOCUMENTS

| KR | 10-2010-0126442 A | 12/2010 |
|---|---|---|
| KR | 10-2010-0129021 A | 12/2010 |

OTHER PUBLICATIONS

Mahlke, Scott A., et al. "Effective compiler support for predicated execution using the hyperblock." ACM SIGMICRO Newsletter. vol. 23. No. 1-2. IEEE Computer Society Press, 1992, pp. 1-10.*

Engblom, Jakob. "Processor pipelines and static worst-case execution time analysis." (2002), Uppsala University Library, Box 510, SE-751 20 Uppsala, Sweden, pp. 1-130.*

Chekuri C et al: "Profile-driven instruction level parallel scheduling with application to super blocks", Proceedings of the 29th. Annual IEEE/ACM International Symposium on Microarchitecture. Micro-29. Paris, Dec. 2-4, 1996; [Proceedings of the Annual IEEE/ACM International Symposium on Microarchitecture. (Micro)], Los Alamitos, IEEE Comp. Soc. Press,, vol. Symp. 29, Dec. 2, 1996, pp. 58-67, XP010206085.

Michael Chase et al: "A computational study of heuristic and exact techniques for superblock instruction scheduling" Journal of Scheduling, Kluwer Academic , Publishers, BO, vol. 15, No. 6, Jun. 20, 2012, pp. 743-756, XP035130396.

Abraham S G et al: "Meld Scheduling: A Technique for Relaxing Scheduling Constraints", International Journal of Parallel Programming, Plenum Press, New York, US, vol. 26, No. 4, Aug. 1, 1998, pp. 349-381, XP000783000.

Lee M et al: "Software pipelining and superblock scheduling: compilation techniques for VLIW machines", System Sciences, 1993, Proceeding of the Twenty-Sixth Hawaii International Conference on Wailea, HI, USA Jan. 5-8, 1993, Los Alamitos, CA, USA, IEEE, US, vol. i, Jan. 5, 1993, pp. 202-213, XP010640444.

Communication from the European Patent Office issued Apr. 3, 2014 in a counterpart European Application No. 14151699.7.

* cited by examiner

FIG. 1A

| time | 0 | 1 | 2 | 3 | 4 | 5 | 6 |
|---|---|---|---|---|---|---|---|
| op |
| op 0 | IF | ID | EX | WB | | | |
| op 1 | | IF | ID | EX | WB | | |
| op 2 | | | IF | ID | EX | WB | |
| op 3 | | | | IF | ID | EX | WB |

FIG. 1B

| time | 0 | 1 | 2 | 3 | 4 | 5 | 6 |
|---|---|---|---|---|---|---|---|
| op |
| op 0 | IF | ID | EX | WB | | | |
| op 1 | | IF | ID | EX1 | EX2 | WB~101 | |
| op 2 | | | IF | ID | EX | WB | |
| op 3 | | | | IF | ID | EX | WB |

# COMPILING METHOD AND APPARATUS FOR SCHEDULING BLOCK IN PIPELINE

CROSS-REFERENCE TO RELATED APPLICATION

This application claims priority from Korean Patent Application No. 10-2013-0009058, filed on Jan. 28, 2013, in the Korean Intellectual Property Office, the entire disclosure of which is incorporated herein by reference.

BACKGROUND

1. Field

Methods and apparatuses consistent with exemplary embodiments relate to a compiling method and apparatus for scheduling a block in a pipeline of a program code.

2. Description of the Related Art

In a computer structure having multiple pipelines, writeback refers to temporary register storage of data to be recorded in a magnetic disc according to an operation. The total system latency may be reduced by recording data in a register through writeback because recording involving a physical operation is slower than electrical processing.

In a case in which operation latency differs for each operation, operations started from different cycles may write data to a register concurrently. This is referred to as a register writeback conflict.

Accordingly, there is a demand for a compiler technique that may avoid a register writeback conflict and may minimize latency.

SUMMARY

According to an aspect of an exemplary embodiment, there may be provided a compiling method for scheduling a block in a pipeline, the compiling method including profiling an access count of a block in a control flow of a program code, determining the block in which an edge count of an edge entering the block is greater than or equal to a predetermined value to be an important block, the edge count being included in the access count of the block, and scheduling the important block based on the access count to prevent a register writeback conflict.

The determining of the block in which the edge count of the edge entering the block is greater than or equal to the predetermined value to be the important block, the edge count being included in the access count of the block, may include marking an edge having an edge count greater than or equal to a predetermined important limit as an important edge, and determining a block into which the important edge enters, to be the important block.

The marking of the edge having the edge count greater than or equal to the predetermined important limit as the important edge may include, marking the important edge entering from an unscheduled block as a normal edge.

The scheduling of the important block based on the access count to prevent the register writeback conflict may include sorting the block according to a priority determined based on the access count, and scheduling the block sequentially in an order of sorting the block based on the priority.

The determining of the block in which the edge count of the edge entering the block is greater than or equal to the predetermined value to be the important block, the edge count being included in the access count of the block, may include forming a superblock from the block based on the access count.

The scheduling of the important block based on the access count to prevent the register writeback conflict may include scheduling an operation absent executing writeback in a cycle in which the register writeback conflict is expected in the important block.

The scheduling of the operation absent executing writeback in the cycle in which the register writeback conflict is expected in the important block may include scheduling a No Operation (NOP) in the cycle in which the register writeback conflict is expected.

The scheduling of the important block based on the access count to prevent the register writeback conflict may include scheduling a store operation in the cycle in which the register writeback conflict is expected.

The scheduling of the important block based on the access count to prevent the register writeback conflict may include scheduling an operation of the important block to execute writeback inside the important block or in a block connected to the important block with an edge.

The compiling method may further include scheduling taking no account of writeback in an unimportant block.

The scheduling of taking no account of writeback in the unimportant block may include applying a stall cycle in a physical approach in a cycle in which the register writeback conflict is expected in the unimportant block.

The compiling method may further include scheduling to execute writeback of an operation in the unimportant block when an edge exiting from the unimportant block to an already scheduled block is present.

According to an aspect of another exemplary embodiment, there may be provided a compiling apparatus for scheduling a block in a pipeline, the compiling apparatus including a block profiling unit to profile an access count of a block in a control flow of a program code, a block determining unit to determine the block in which an edge count of an edge entering the block is greater than or equal to a predetermined value to be an important block, the edge count being included in the access count, and a block scheduling unit to schedule the important block based on the access count to prevent a register writeback conflict.

The compiling apparatus may further include a superblock forming unit to form a superblock from the block based on the access count, and the block scheduling unit may sort the block and the superblock according to a priority determined based on the access count, and may schedule the block and the superblock sequentially in a sorted order.

The block determining unit may include an edge marking unit to mark an edge having an edge count greater than or equal to a predetermined important limit as an important edge in the block, and to mark the important edge entering from an unscheduled block as a normal edge, and the block determining unit may determine the block, in which the important edge enters, to be the important block.

The block scheduling unit may schedule an operation absent executing writeback in a cycle in which the register writeback conflict is expected in the important block, and when an edge exiting from an unimportant block to an already scheduled block is present, may schedule to execute writeback of an operation in the unimportant block.

The compiling apparatus may further include a stall applying unit to apply a stall cycle in a cycle in which the register writeback conflict is expected to take place in the unimportant block.

According to an aspect of another embodiment, there may be provided a non-transitory computer-readable medium comprising a program for instructing a computer to perform the compiling method for scheduling a block in a pipeline.

According to an aspect of another embodiment, there may be provided a compiling method of scheduling a block in a pipeline. The compiling method may include determining, using a processor, whether the block is an important block using an access count of the block; and scheduling, in response to determining that the block is an important block, the block so as to prevent the block from causing a register writeback conflict.

The access count of the block may be a ratio of a number of uses of the block to a total number of accesses of a compiled program code as a result of simulating at least one operation instruction.

The compiling method may further include scheduling, in response to determining that the block is an unimportant block, the block so as to permit the block to cause a register writeback conflict.

The compiling method may further include determining, in response to scheduling the block so as to permit the block to cause a register writeback conflict, whether the block is expected to cause a register writeback conflict, and in response to determining that the block is expected to cause the register writeback conflict, applying a stall cycle.

According to an aspect of another embodiment, there may be provided a compiling apparatus for scheduling a block in a pipeline. The compiling apparatus may include a block determining unit configured to determine whether the block is important or unimportant by comparing an edge count of an edge entering the block with a predetermined value; and a block scheduling unit configured to schedule the block in the pipeline so that in response to the block being important, the block is scheduled so as to prevent the block from causing a register writeback conflict, and in response to the block being unimportant, the block is scheduled so as to permit the block to cause a register writeback conflict.

The block scheduling unit may be further configured to determine, in response to the block being unimportant, whether the block is expected to cause the register writeback conflict, and in response to determining that the block is expected to cause the register writeback conflict, to apply a stall cycle in a cycle in which the register writeback conflict is expected.

BRIEF DESCRIPTION OF THE DRAWINGS

The above and other aspects will become apparent and more readily appreciated from the following detailed description of certain exemplary embodiments, taken in conjunction with the accompanying drawings of which:

FIGS. 1A and 1B are diagrams illustrating writeback occurring due to each operation having the same or different latencies in a pipeline according to an exemplary embodiment;

DETAILED DESCRIPTION

Figure 2:
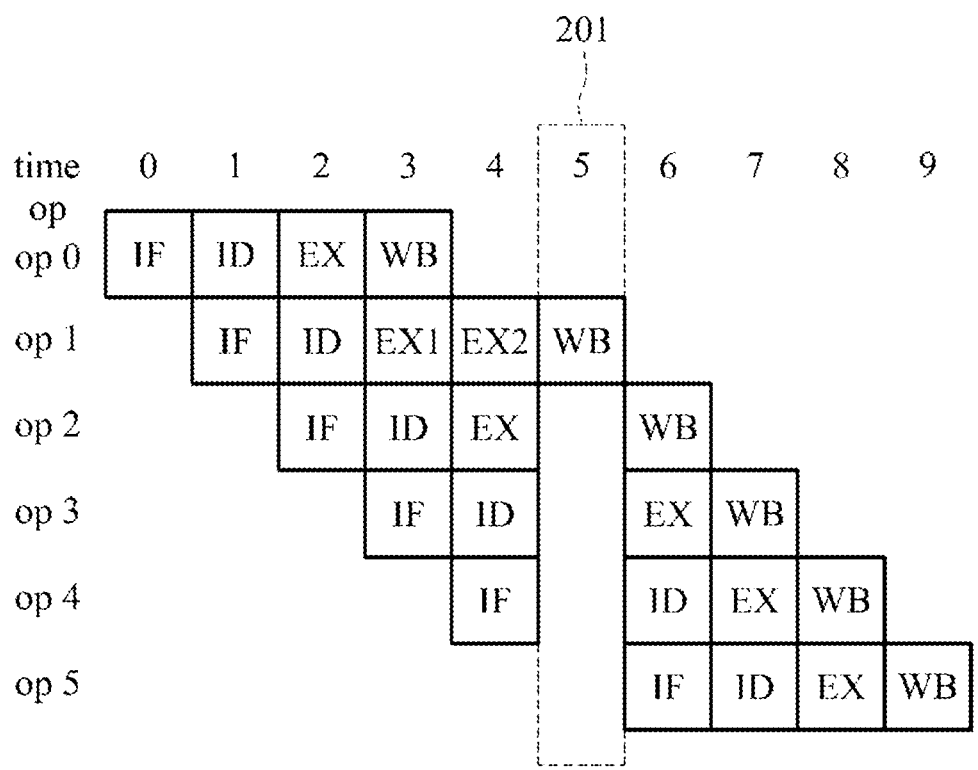
FIG. 2 is a diagram illustrating a stall cycle applied to avoid a register writeback conflict in a pipeline.

Terms used herein throughout the present disclosure may be defined as follows.

A pipeline may refer to an architecture for designing a system to divide one processor into a series of sub-processors having different functionalities and to enable the sub-processors to process data concurrently. Here, a period of time taken to complete an operation by executing one instruction through multiple steps may be referred to as latency, and a period of time taken for each step may be referred to as a cycle.

A control flow may correspond to a group of control codes for designating input/output devices for processing, and linking a name of a program to hardware, and may refer to a concept of all possible paths on a program execution sequence, expressed as a flow diagram.

In the control flow, "div" denotes a division operation, "mul" denotes a multiplication operation, "add" denotes an addition operation, "sub" denotes a subtraction operation, "shift" denotes an operation of shifting bit values to the left or right in a register, "jump" denotes an operation of repeating a loop without conditions, "branch" denotes an operation of repeating a loop with conditions, "load" denotes an operation of fetching a value from a memory, and "nop" or "NOP" denotes a NO Operation. A value that follows each abbreviation denotes a designated number of a block. For example, "add3" denotes an addition operation being performed in a third block.

Here, the control flow may imply a plurality of blocks according to a program code, and in each block, a row direction may denote an order of cycles in which an operation is executed. Taking FIG. 4 as an example, in a first block 491, "div1" may be executed first and "branch" may be executed after an NOP of four cycles is executed. According to an exemplary embodiment, a program code may include an intermediate representation (IR) code into which a language is converted within a compiler, for example, C, C++, JAVA, and the like. That is, the compiler may convert a high-level language into a machine language through a processor.

FIGS. 1A and 1B illustrate a register writeback conflict that may occur due to operations having different latencies and illustrate writeback occurring due to each operation having the same or different latencies in a pipeline according to an exemplary embodiment In FIGS. 1A and 1B, IF denotes an instruction fetch operation, that is, an operation being performed by a processor until fetching an instruction to be executed next from a memory after execution of one instruction is completed, ID denotes an instruction decode operation of determining a type of the instruction fetched from the memory, EX denotes an execution operation of executing the instruction based on the type of the instruction determined in the ID step, and WB denotes a writeback operation of temporarily storing data to be recorded in a magnetic disc in a register according to an operation.

Here, a horizontal axis denotes a cycle, and a vertical axis denotes an operation.

Referring to FIG. 1A, a WB may be executed in different cycles for each operation by equalizing the operation latencies. Here, the same latency allocated to each operation may correspond to a longest latency among the latencies of the operations. However, register writeback may be impossible for an operation having a short latency even though a result is produced. For this reason, data forwarding may be needed. However, in a case of a very long instruction word (VLIW), data forwarding may be impossible due to a wide issue width, and data forwarding may be not enabled in processors having a high clock frequency and a long pipeline.

Referring to FIG. 1B, WB 101 may work in the same cycle for each operation having different latencies. For example, a first operation (op1) and a second operation (op2) have different cycles from an IF to a WB, that is, four cycles and three cycles, respectively. When the op1 is executed in a first cycle and the op2 is executed in a second cycle, a WB 101 of the op1 and the op2 is executed in a fifth cycle. Accordingly, a register writeback conflict in which data is written to a register concurrently may occur between different operations.

Figure 3:
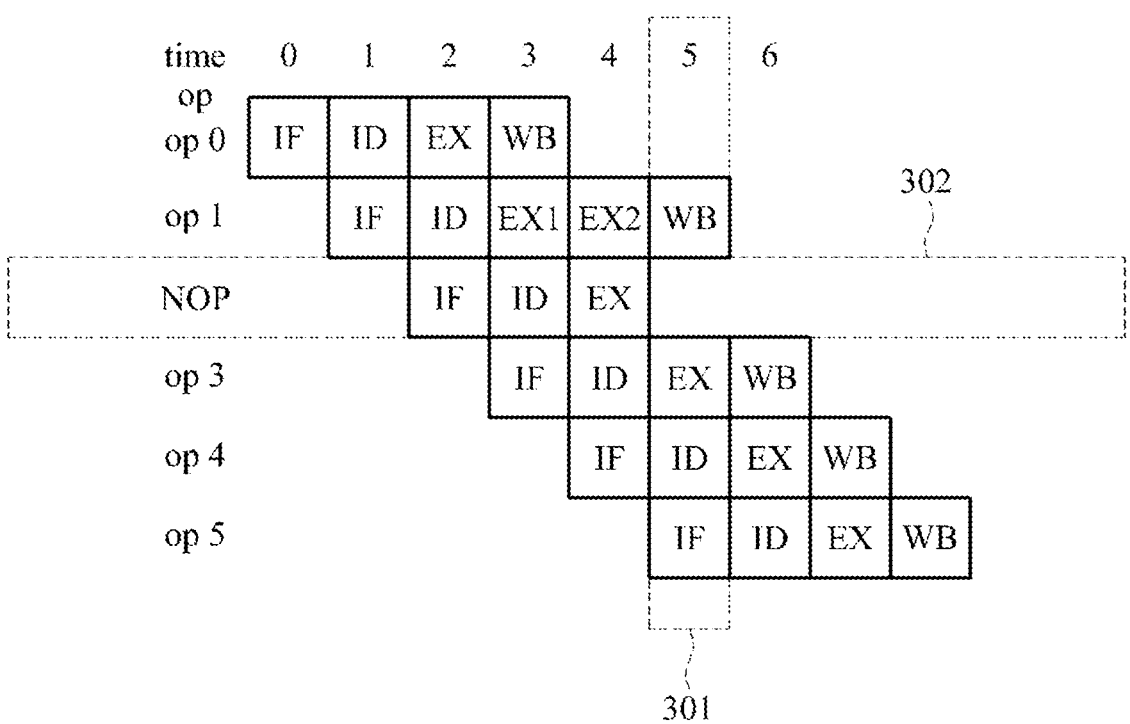
FIG. 3 is a diagram illustrating a No Operation (NOP) inserted to avoid a register writeback conflict in a pipeline.

The register writeback conflict may be prevented by equalizing the latency using a complex forwarding logic, as shown in FIG. 1A. A hardware approach may be contemplated to avoid the register writeback conflict, for example, a register write buffer or a pipeline stall as shown in FIG. 2. As a software approach, block scheduling may be used to resolve the register writeback conflict as shown in FIGS. 3 through 5.

FIG. 2 is a diagram illustrating a stall cycle applied to avoid a register writeback conflict in a pipeline. Similar to FIG. 1, a horizontal axis denotes a cycle and a vertical axis denotes an operation.

When a register writeback conflict occurs, a pipeline may be stalled, one register may be written back, the pipeline may be unstalled, and the other registers may be written. For example, to avoid a register writeback conflict between the op1 and the op2, a stall cycle 201 may be applied between an operation 2 (op2) and an operation 5 (op5) in a fifth cycle. This pipeline stall may stop the entire pipeline, and frequent pipeline stalls may result in reduced performance.

As another hardware approach for avoiding a register writeback conflict, a register write buffer may be used. When a register writeback conflict occurs, one register may be placed in a register write buffer and may be written in a next cycle. In this case, when a register writeback conflict occurs again in the next cycle, the conflict may not be avoided. This approach may be only applicable to a pipeline having a one-cycle latency, and may be unsuitable in recent circumstances in which a long latency and a short latency coexist.

FIG. 3 is a diagram illustrating an NOP inserted to avoid a register writeback conflict in a pipeline. As a software approach, operation scheduling may be used. A register writeback conflict may be recognized in advance, and operations may be scheduled to avoid a register writeback conflict.

When a register is already written in a desired cycle, the pipeline may be scheduled to insert an operation having no need to write to a register. For example, the operation having no need to write to a register may include a store operation or an NOP 302. When a register writeback conflict occurs between the op1 and the op2 in a fifth cycle as illustrated, a stall cycle 301 may be needed to avoid the conflict. In lieu of the stall cycle, the NOP 302 may be inserted. In this case, incorrect scheduling may increase a number of the NOPs 302, resulting in reduced performance.

Figure 4A:
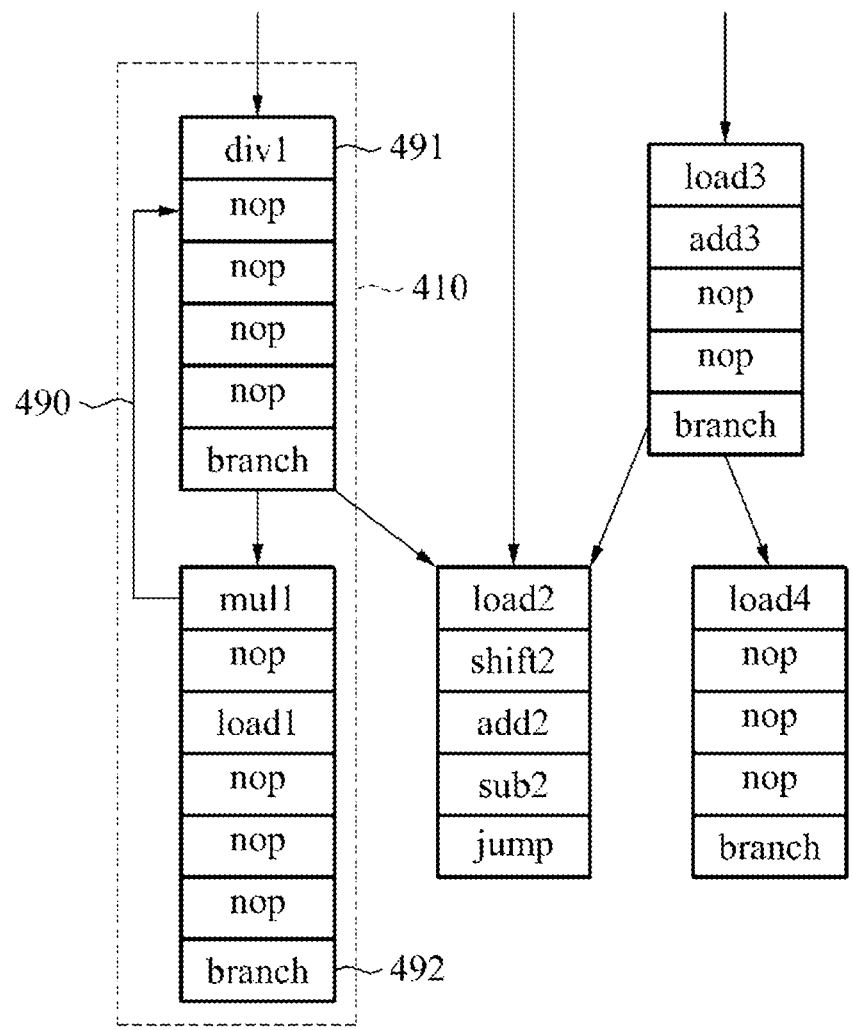
FIGS. 4A and 4B are diagrams illustrating a control flow of speculation in a superblock.
Figure 4B:
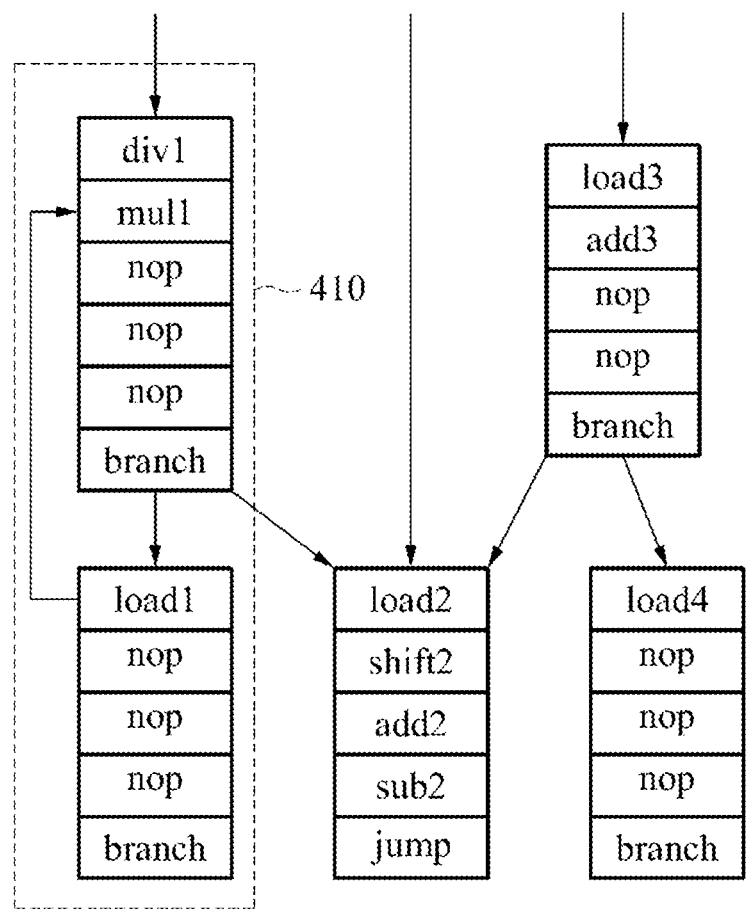
Figure 5:
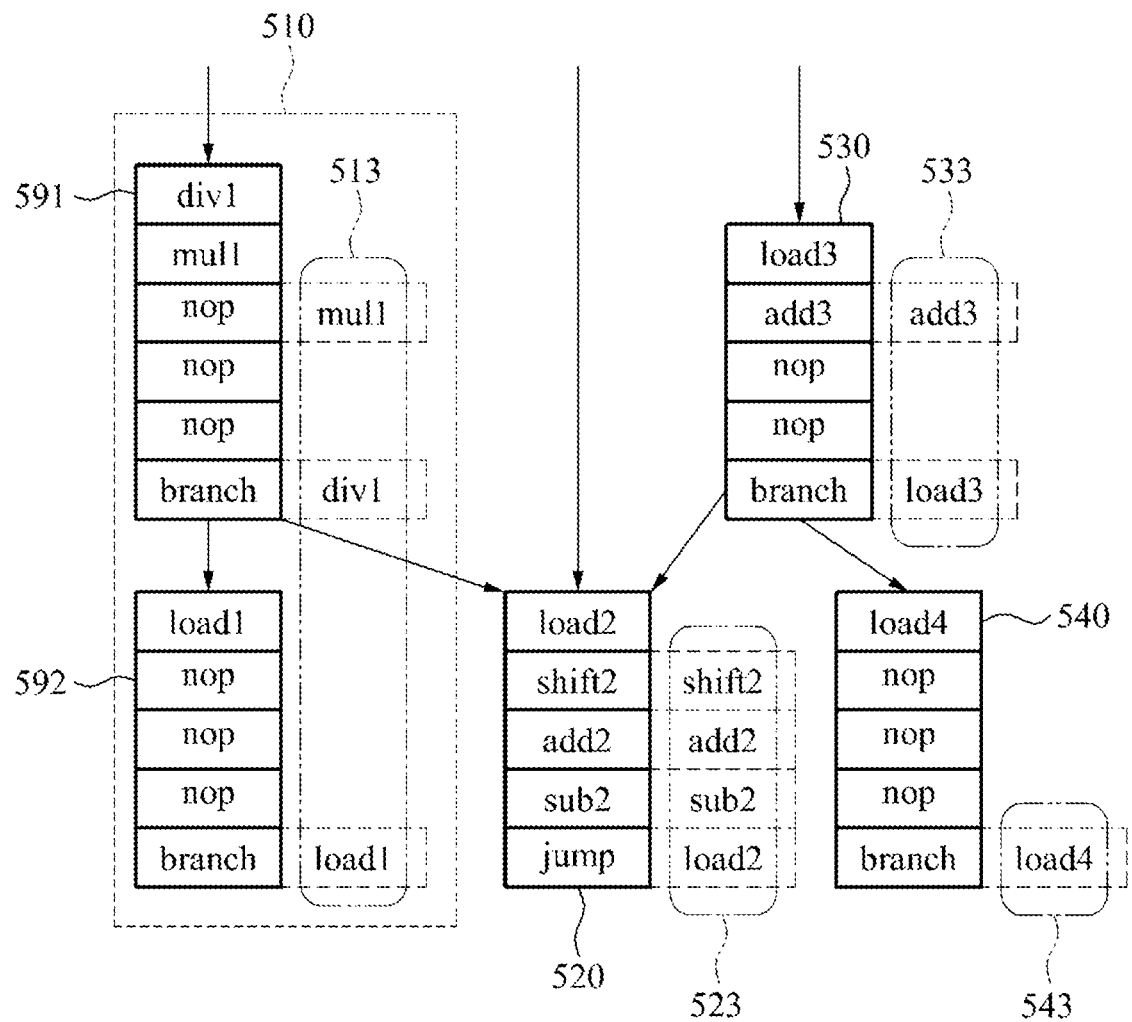
FIG. 5 is a diagram illustrating a control flow of an NOP in a basic block (BB)

FIGS. 4A and 4B are diagrams illustrating a control flow of speculation in a superblock. As another software approach for avoiding a register writeback conflict, global scheduling may be contemplated. The global scheduling may refer to operation scheduling performed on a group of basic blocks (BBs) concurrently, rather than operation scheduling in a BB. A superblock may be a typical example of global scheduling, and may include only an out-edge, but not in-edge between blocks. Here, an edge may refer to a direction moving from one block to another according to an access, that is, an order of operations. More specifically, an access may be understood as passing through each block in order to operate an optional operation instruction in the process of performing a simulation through the optional operation instruction with respect to the compiled program code.

This block scheduling may usually be performed using an equal length latency taking no account of register writeback or may be performed to complete register writeback in a BB. In this case, the performance may be reduced due to a register writeback conflict.

For example, as shown in FIG. 4A, a $1^{st}$ block 491 and a $2^{nd}$ block 492 may form a first block 410 as a superblock, and a second block, a third block, and a fourth block may be present on a control flow of a program code. Through speculation 490, a mull operation may be scheduled from the $2^{nd}$ block 492 of the first block 410 to the $1^{st}$ block 491. As shown in FIG. 4B, a number of NOPs may be reduced in the $1^{st}$ block 491 and the $2^{nd}$ block 492 of the first block 410 due to the scheduled mull operation.

FIG. 5 is a diagram illustrating a control flow of an NOP in a BB. A first block 510 may correspond to a superblock formed from a $1^{st}$ block 591 and a $2^{nd}$ block 592. In the first block 510, a cycle 513 in which writeback of each operation occurs may be illustrated as a dotted line at the right side. In the first block 510, each operation may be executed, and after one or two cycles, writeback may occur in the cycle 513 illustrated as a region indicated by a dotted line at the right side.

Similar to the first block 510, a cycle 523 in which writeback of each operation of a second block 520 occurs, a cycle 533 in which writeback of each operation of a third block 530 occurs, and a cycle 543 in which writeback of each operation of a third block 540 occurs, may be illustrated.

As shown in FIG. 5, operation scheduling may work in a superblock and a BB. In this case, the system performance may be reduced because of a plurality of NOPs occurring to each block to complete each operation in a block.

Hereinafter, exemplary embodiments will be described in detail with reference to the accompanying drawings.

Figure 6:
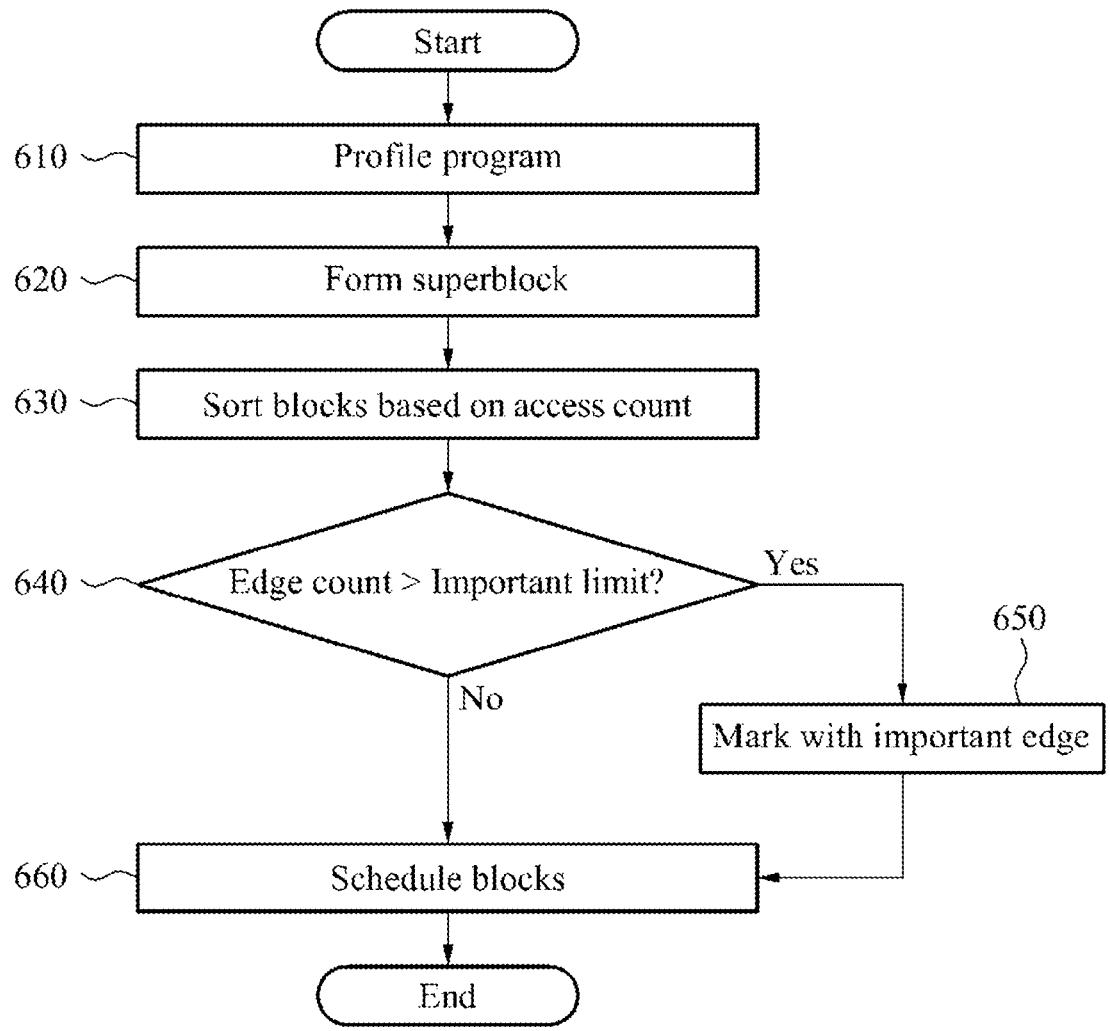
FIG. 6 is a flowchart illustrating a compiling method for scheduling a block in a pipeline according to an exemplary embodiment.

FIG. 6 is a flowchart illustrating a compiling method for scheduling a block in a pipeline according to an exemplary embodiment.

In operation 610, a compiler may profile a program code. In a control flow of a program code, an access count may be profiled for each block. An edge count may be calculated for each block by profiling the access count. For example, the edge count may refer to counting a number of in-edges, in particular, edges entering into each block through simulation. In turn, an out-edge may correspond to an edge existing from each block to another block. The edge may be understood to be a path between the blocks through which the optional operation instruction passes to be operated in the process of performing a simulation with respect to the program code. Further, the edge count may be considered to be a ratio of use of the corresponding path or a ratio of use of the corresponding path in relation to a total number of accesses (a predetermined number), in the case of a predetermined number of the operation instructions being given.

According to an exemplary embodiment, the access count and the edge count may be calculated through simulation of a program code, given a predetermined total number of accesses. For example, the access count and the edge count may be represented by a ratio of a number of accesses per block and a ratio of a number of edges per block, in relation to a total number of accesses, respectively. Thus, an access count may be understood as a ratio of the number of use of each block or a ratio of the number of use of a block to a total number of accesses with respect to the compiled program code, as a result of simulating one or more operation instructions. Also, an access count may be considered to be a sum of edge counts.

In operation 620, the compiler may form a superblock based on the access count. The compiler may form the superblock by grouping at least two blocks based on the access count. According to an exemplary embodiment, in a case in which an access count for each of at least two blocks is great and the blocks are connected to one another with an edge, a superblock may be formed.

In operation 630, the compiler may sort the blocks according to a priority determined based on the access count. As a ratio of a number of accesses per block in relation to a total number of accesses becomes higher, a block having such a ratio may have a higher priority. According to an exemplary embodiment, a block intended to form a superblock may be sorted to be a highest priority block based on a highest access count.

In operation 640, the compiler may determine whether the edge count is greater than a predetermined important limit. Here, the predetermined important limit may be set arbitrarily by a user when compiling the program code. According to an exemplary embodiment, the predetermined important limit for the edge count may be, but is not limited to 10%. That is, 10% is just an example and is not intended to be limiting as the predetermined important limit for the edge count arbitrarily set by the user.

In operation 650, the compiler may mark an edge having an edge count greater than or equal to the predetermined important limit as an important edge. Here, when a block receiving an important edge as an in-edge has a higher priority than a block sending an important edge as an out-edge, even an important edge may be marked as a normal edge. That is, when an important edge exits from an unscheduled block, the corresponding important edge may be marked as a normal edge.

In operation 660, the compiler may schedule the important block in a sorted order based on the access count. The compiler may sort the block and the superblock according to the priority based on the access count, and may schedule the blocks sequentially in a sorted order according to the priority. Here, register writeback delivered to the important edge may be scheduled across BBs. To reduce the system complexity, scheduling may be performed to complete writeback in the BB.

In the related art, a scheduling operation in a BB is completed by adding an NOP to the BB. Thus, the cycle is increased corresponding to the added NOP and the entire execution time will be longer. In contrast, a scheduling operation as described herein is across BBs. Thus, the operation is completed in another BB by adding the minimum NOP to a BB thereby causing the execution time to be shorter than that of the related art. This difference can be understood based on the number of added NOPs in FIGS. 5 and 13A. In other words, in the case of scheduling across BBs, fewer NOPs are added when compared to the case of scheduling in a BB. Also, the foregoing feature can be understood based on a comparison of a superblock 510 of FIG. 5 and a superblock of FIG. 13.

Subsequently, scheduling may be performed taking no account of writeback of an unimportant block. In the unimportant block, a stall cycle may be applied in a cycle in which a register writeback conflict is expected, to delay a sequent operation for one cycle. According to an exemplary embodiment, the unimportant block may have an insignificant influence on the performance due to having a low access count and a low probability of execution.

Each operation described in the foregoing is described in further detail with reference to FIGS. 7 through 13.

Figure 7A:
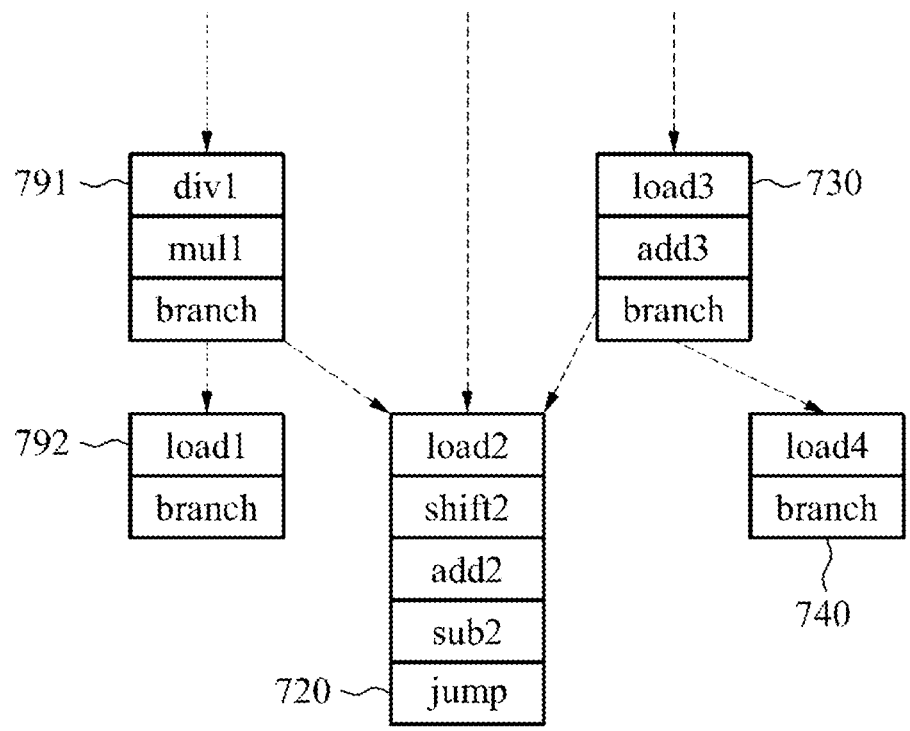
FIGS. 7A and 7B are diagrams illustrating a control flow for a program code being profiled according to an exemplary embodiment.
Figure 7B:
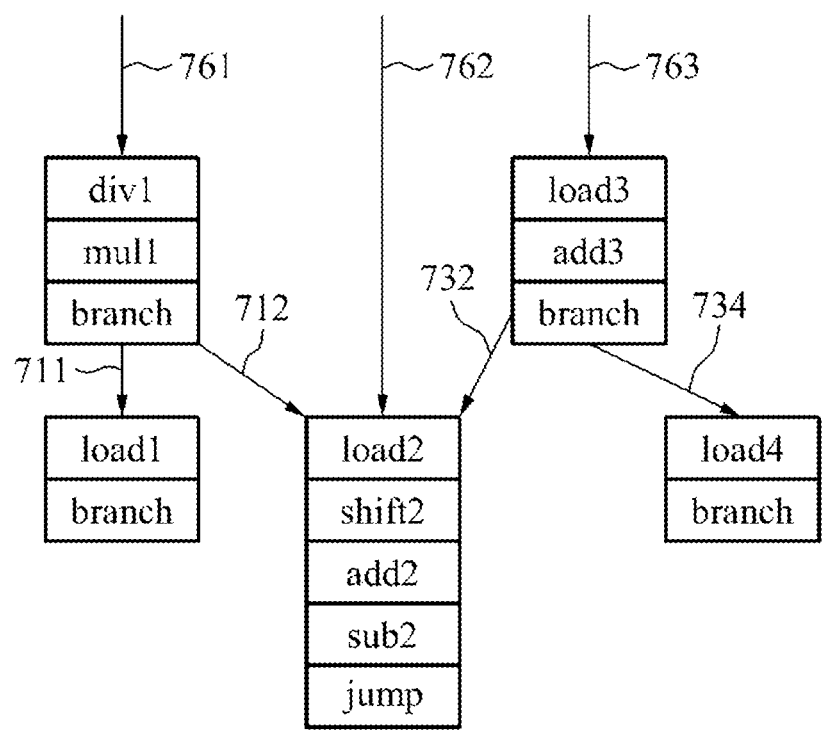

FIGS. 7A and 7B are diagrams illustrating a control flow for a program code being profiled according to an exemplary embodiment. Herein, operation 610 of FIG. 6 is described in further detail. Each block 791, 792, 720, 730, and 740 in the control flow according to the program code are illustrated.

Referring to FIG. 7A, a control flow is illustrated as an edge count being uncalculated due to non-profiling for each block. Referring to FIG. 7B, a control flow is illustrated as an edge count being calculated through simulation over the entire access after profiling for each block. For example, as a result of edge count calculation, an edge 761 entering a $1^{st}$ block 791 of a first block may have an edge count of 85%, an edge 711 entering a $2^{nd}$ block 792 of the first block may have an edge count of 80%, an edge 712 entering from the first block 791 of the first block to a second block 720 may have an edge count of 5%, an edge 762 entering the second block 720 may have an edge count of 10%, an edge 763 entering a third block 730 may have an edge count of 5%, an edge 732 entering from the third block 730 to the second block 720 may have an edge count of 2%, and an edge 734 entering from the third block 730 to a fourth block 740 may have an edge count of 3%.

Figure 8A:
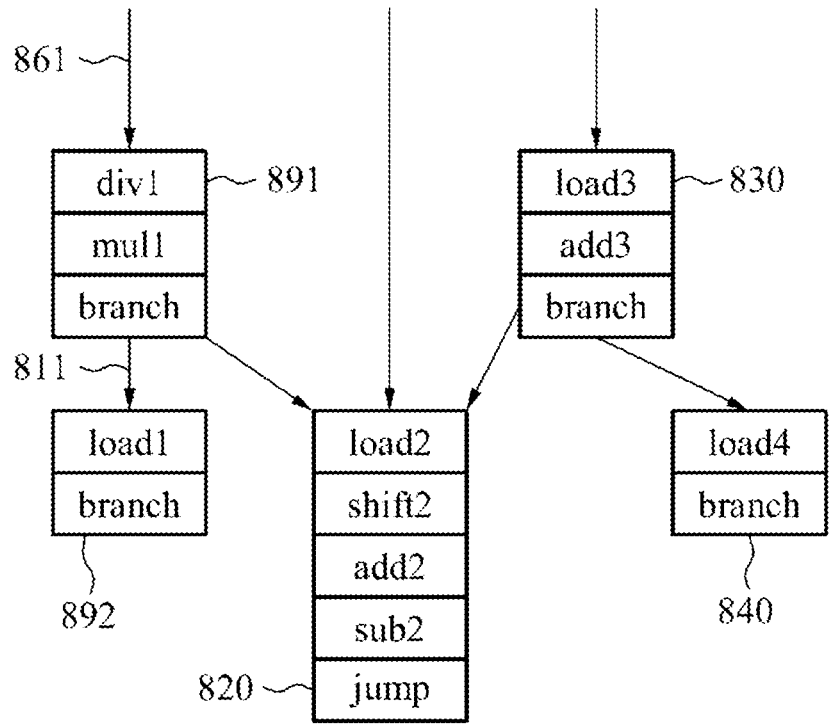
FIGS. 8A and 8B are diagrams illustrating a control flow for a superblock being formed based on a profiling result according to an exemplary embodiment.
Figure 8B:
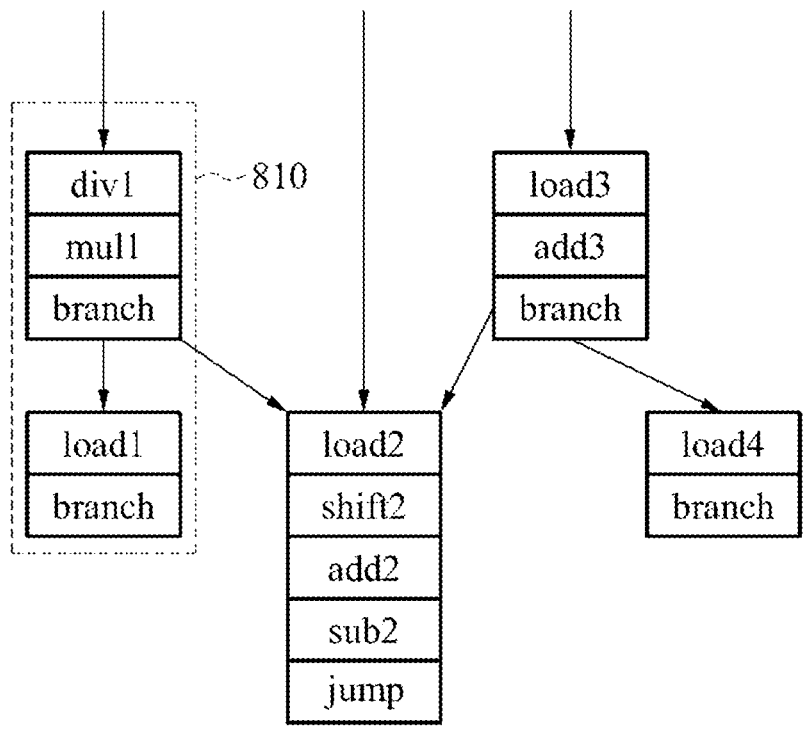

FIGS. 8A and 8B are diagrams illustrating a control flow for a superblock being formed based on a profiling result according to an exemplary embodiment. Herein, operation 620 of FIG. 6 is described in further detail. For each block 891, 892, 810, 820, 830, and 840, an edge count and an access count calculated as a sum of edge counts may be the same as those of FIG. 7.

Referring to FIG. 8A, an edge 861 entering a $1^{st}$ block 891 of a first block 810 may have an edge count of 85%, and an edge 811 entering a $2^{nd}$ block 892 of the first block 810 may have an edge count of 80%. Referring to FIG. 8B, the $1^{st}$ block 891 and the $2^{nd}$ block 892 having a high access count, for example, an access count greater than or equal to a predetermined value, may be grouped to form the first block 810 as a superblock.

Figure 9A:
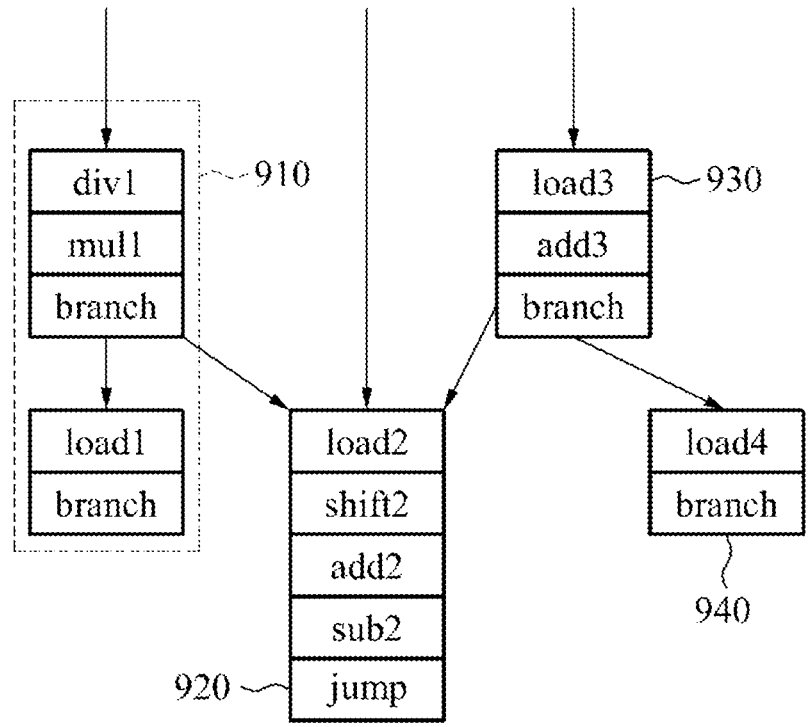
FIGS. 9A and 9B are diagrams illustrating a control flow for a block being sorted based on a profiling result according to an exemplary embodiment.
Figure 9B:
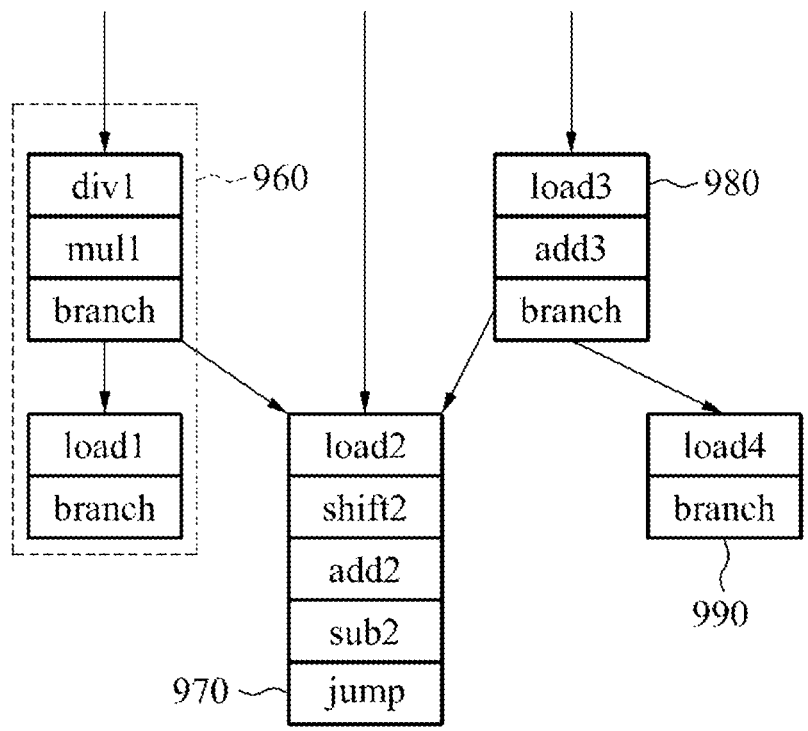

FIGS. 9A and 9B are diagrams illustrating a control flow for a block being sorted based on a profiling result according to an exemplary embodiment. Herein, operation 630 of FIG. 6 is described in further detail. For each block, an access count and an edge count may be the same as those of FIG. 7.

Referring to FIG. 9A a first block 910 may have an access count of 85%, a second block 920 may have an access count of 17%, a third block 930 may have an access count of 5%, and a fourth block 940 may have an access count of 3%. Referring to FIG. 9B, the first block 910 having a highest access count may be sorted as a highest priority block 960, the second block 920 having a second highest access count may be sorted as a second highest priority block 970, the third block 930 having a third highest access count may be sorted as a third highest priority block 980, and the fourth block 940 having a lowest access count may be sorted as a last priority block 990.

Figure 10A:
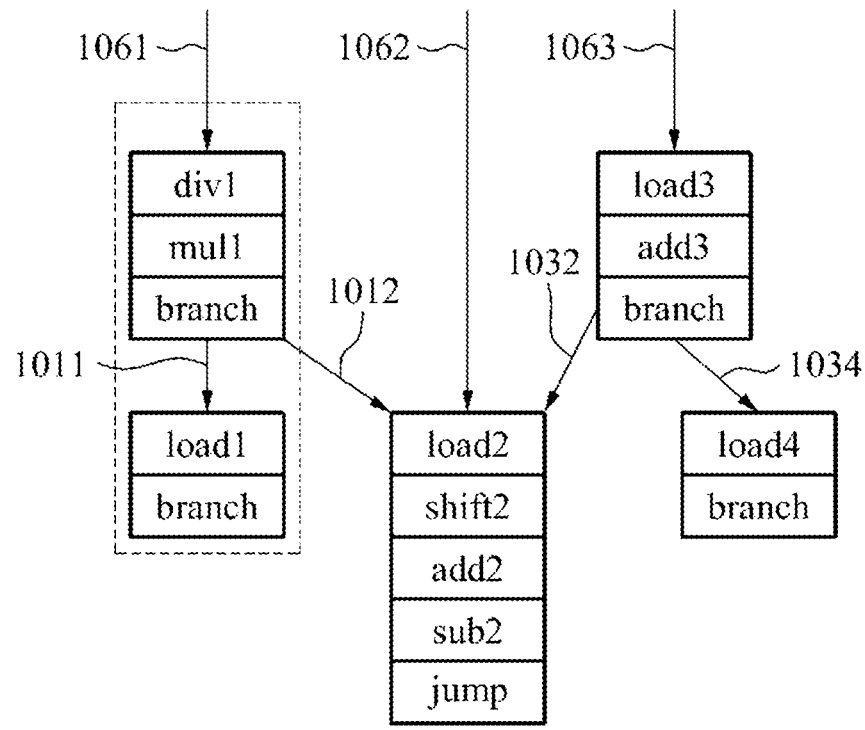
FIGS. 10A and 10B are diagrams illustrating a control flow for an important edge being marked based on a profiling result according to an exemplary embodiment.
Figure 10B:
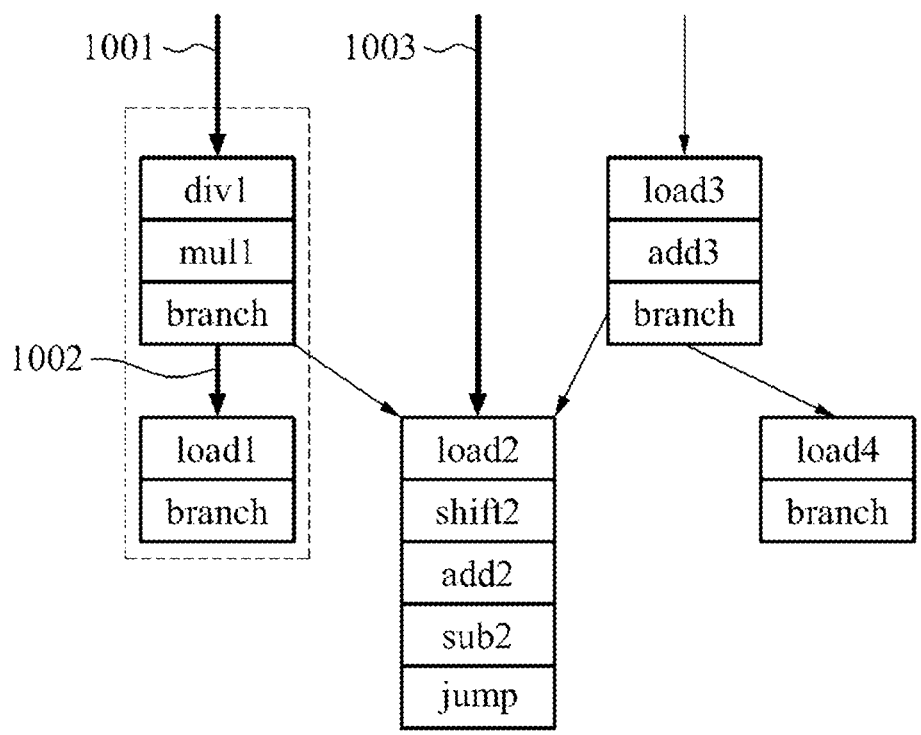

FIGS. 10A and 10B are diagrams illustrating a control flow for an important edge being marked based on a profiling result according to an exemplary embodiment. Herein, operations 640 and 650 of FIG. 6 are described in further detail.

According to an exemplary embodiment, as shown in FIG. 10A, among edges 1061, 1062, 1063, 1011, 1012, 1032, and 1034 for each block, an edge having an edge count greater than or equal to a predetermined important limit may be marked as an important edge. For example, when the important limit is set to be 10% by a user in compiling, an important edge 1001 having an edge count of 85% entering a first block, an important edge 1002 having an edge count of 80% inside the first block, and an important edge 1003 having an edge count of 10% entering a second block may be marked as shown in FIG. 10B.

Figure 11A:
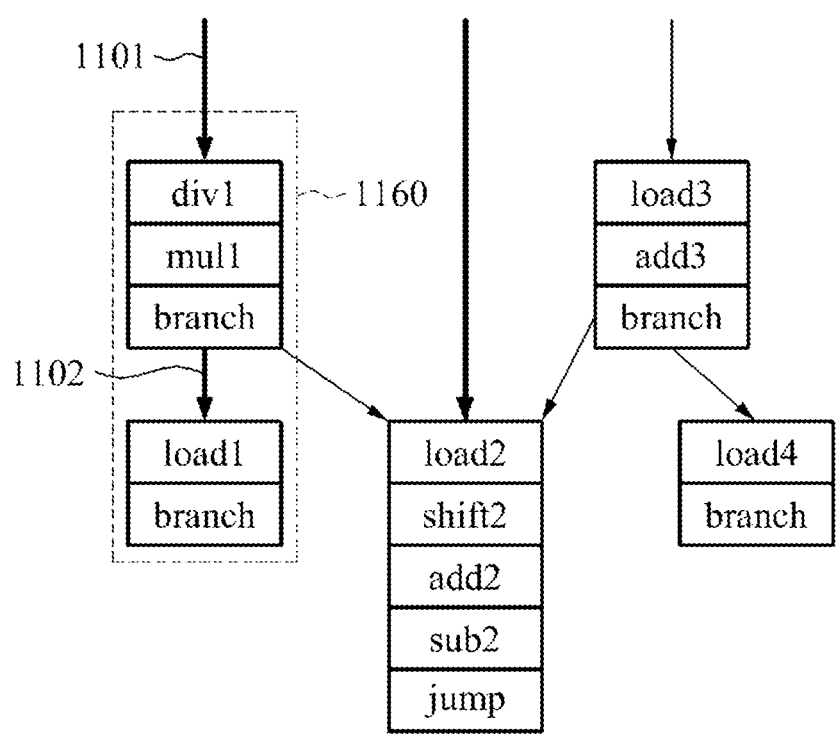
FIGS. 11A and 11B are diagrams illustrating a control flow for a block into which an important edge enters being scheduled according to an exemplary embodiment.
Figure 11B:
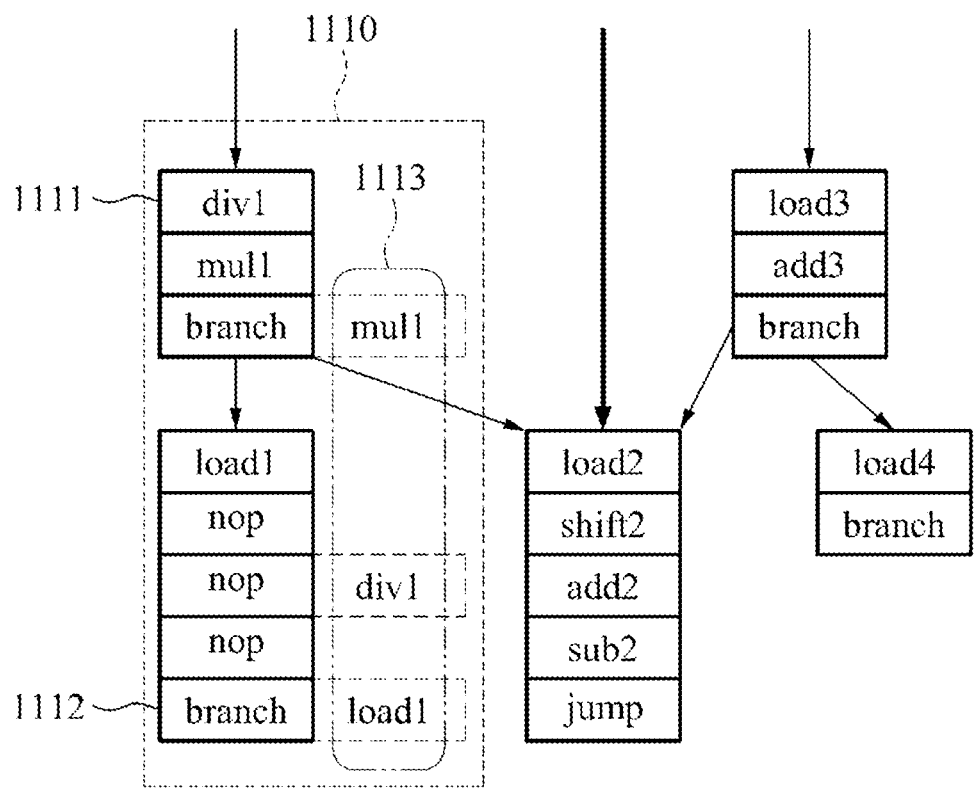

FIGS. 11A and 11B are diagrams illustrating a control flow for a block into which an important edge enters being scheduled according to an exemplary embodiment. Herein, operation 660 of FIG. 6 is described in further detail.

According to an exemplary embodiment, as shown in FIG. 11B, a region 1113 indicated by a dotted line at the right side of a $1^{st}$ block 1111 and a $2^{nd}$ block 1112 in a first block 1110 may represent an order of cycles in which writeback of an executed operation occurs. For example, with regard to a latency taken to complete the execution of each operation in the first block 1110 as a highest priority block 1160, as shown in FIG. 11A, a div1 may have six cycles, mull may have two cycles, and load1 may have five cycles. Here, writeback may occur one or two cycles after execution of each operation is completed based on an individual system, but may occur in the same cycle inside the same system.

As shown in FIG. 11A, the highest priority block 1160 into which marked important edges 1101 and 1102 enter may correspond to an important edge. The important edge may schedule an operation absent executing writeback, in a cycle in which a register writeback conflict is expected, and each operation may be scheduled to complete writeback cross BBs or in a BB. Here, the operation absent executing writeback may include an NOP or store operation.

For example, as shown in FIG. 11B, each operation may be scheduled. In the 1st block 1111 of the first block 1110 formed as a superblock, the div1 may be executed, and a mull may be executed in a next cycle. Here, writeback may occur because the mull has a two-cycle latency.

Subsequently, in the $2^{nd}$ block 1112 of the first block 1110, three NOPs may be scheduled to complete writeback of load1 in the superblock because load1 has a five-cycle latency.

Also, the div1 may be delivered to the second block 1112 with 80% probability based on the edge count calculated in FIG. 7. According to an exemplary embodiment, because the div1 has a six-cycle latency, a register writeback conflict may be avoided by scheduling NOP having no need to execute writeback. Here, the div1 may be delivered to the second block with 5% probability based on the edge count shown in FIG. 7, and a further detailed description is provided with reference to FIG. 12.

Figure 12A:
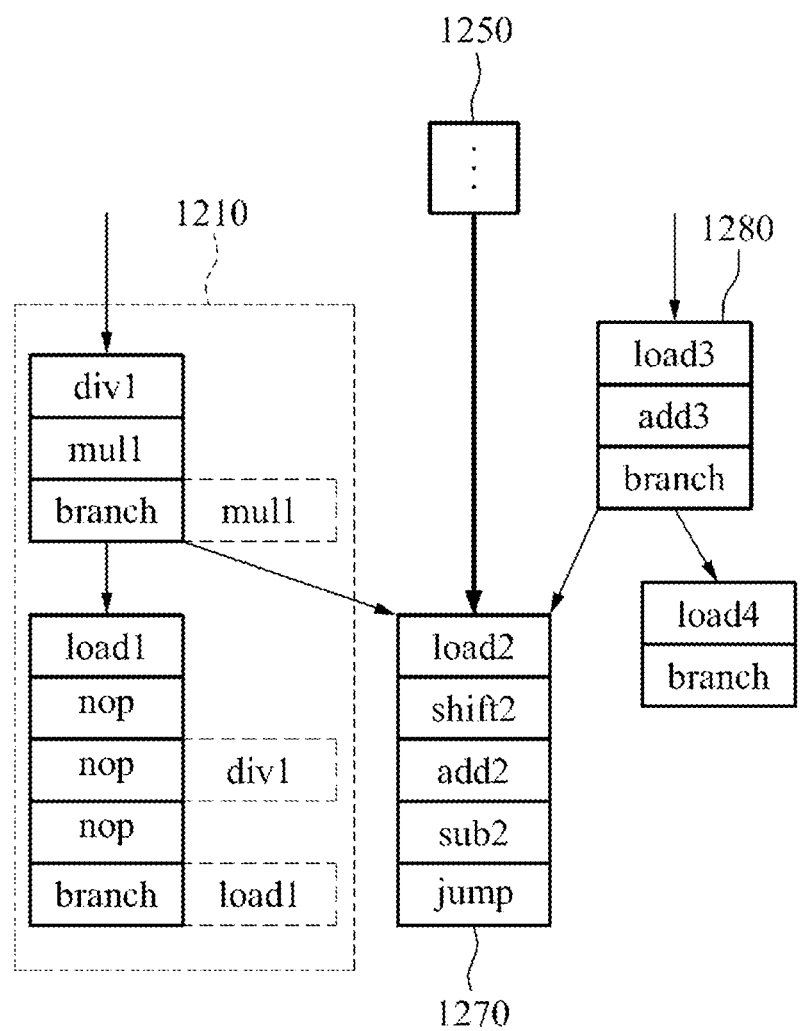
FIGS. 12A and 12B are diagrams illustrating a control flow for a block being scheduled considering an important edge according to an exemplary embodiment.
Figure 12B:
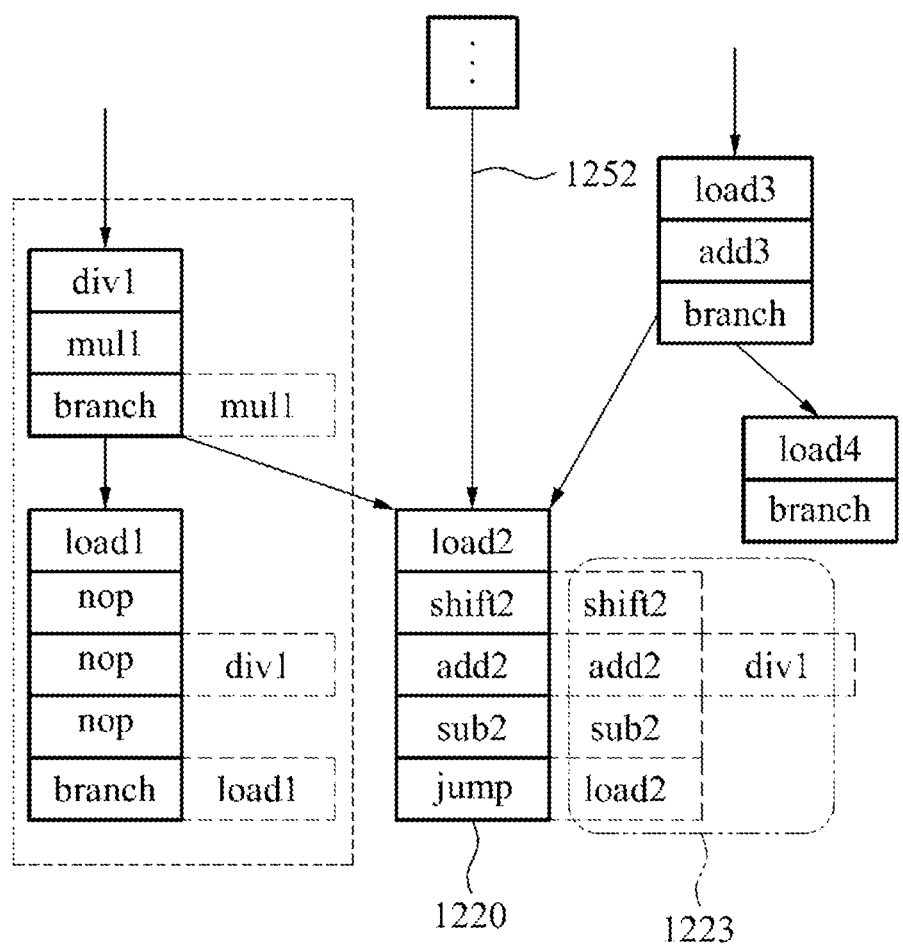

FIGS. 12A and 12B are diagrams illustrating a control flow for a block being scheduled considering an important edge according to an exemplary embodiment. Here, scheduling for a second highest priority block 1270 may be performed in operation 660 of FIG. 6.

As shown in FIGS. 12A and 12B, the second highest priority block 1270 may consider whether an edge from a first block 1210, an edge 1252 from a fifth block 1250, and an edge from a third highest priority block 1280 correspond to an important edge.

Here, the edge 1252 may be difficult to be used for scheduling because, although unscheduled, the edge 1252 from the fifth block 1250 corresponds to an important edge. Accordingly, the edge 1252 from the fifth block 1250 may be marked as a normal edge, even though the edge 1252 from the fifth block 1250 has an edge count greater than or equal to the predetermined important limit, because of relatively low significance. That is, since the edge 1252 corresponds to a normal edge and the other edges corresponds to an unimportant edge because of having an edge count less than the important limit, the second highest priority block 1270 as an unimportant block may be scheduled taking no account of writeback.

According to an exemplary embodiment, a dotted element 1223 at the right side of a second block 1220 may represent an order of cycles in which writeback of an executed operation occurs. For example, for each operation of the second highest priority block 1270, a load2 may have a five-cycle latency, a shift2 may have a one-cycle latency, an add2 may have a one-cycle latency, and sub2 may have a one-cycle latency.

As shown in FIG. 12B, a register writeback conflict may be avoided in a physical approach by scheduling taking no account of writeback because the second block 1220 corresponds to an unimportant block due to an important edge being marked as a normal edge.

For example, writeback may be performed in a cycle shown in FIG. 12B because load2 in the second block 1220 has a five-cycle latency. Here, writeback may occur one or two cycles after execution of the load2 is completed. Subsequently, writeback may be performed immediately since each of a shift2, an add2, and a sub2 has a one-cycle latency.

As described with reference to FIG. 11, writeback may occur in the same cycle as the add2, because div1 delivered from the first block has a six-cycle latency. In this case, since a probability that writeback of div1 occurs in the same cycle as add2 is only 5% as shown in FIG. 7, a stall cycle may be used as a physical approach. According to an exemplary embodiment, an increase in code size may be prevented with no influence on the total performance.

Figure 13A:
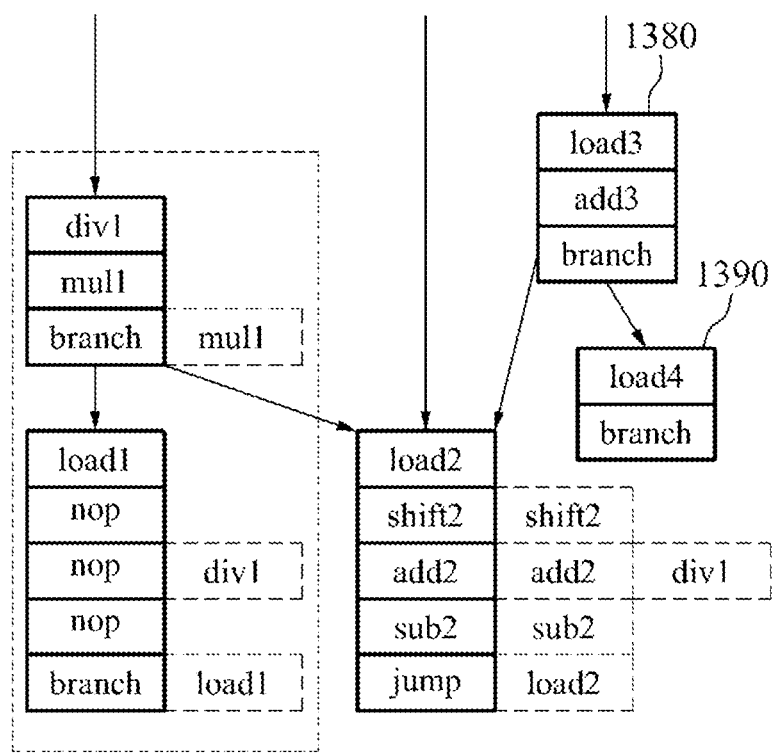
FIGS. 13A and 13B are diagrams illustrating a control flow for a block being scheduled sequentially in a sorted order according to an exemplary embodiment.
Figure 13B:
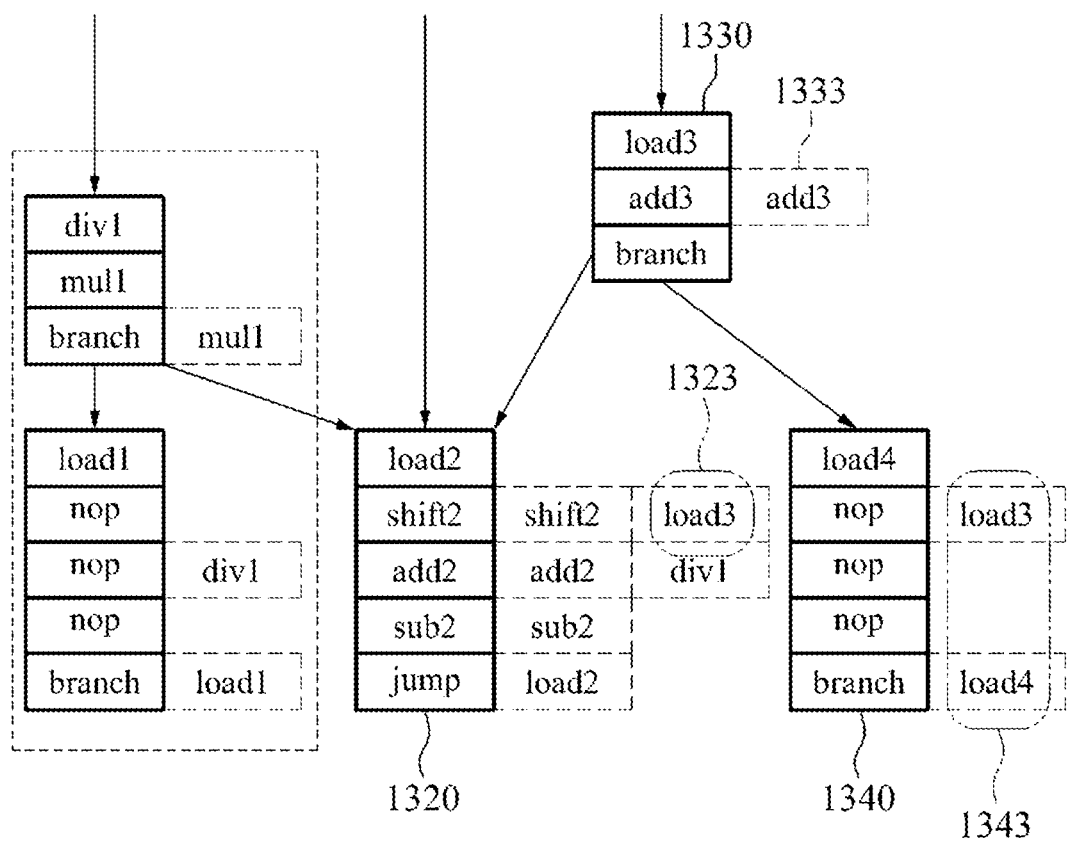

FIGS. 13A and 13B are diagrams illustrating a control flow for a block being scheduled sequentially in a sorted order according to an exemplary embodiment. Herein, scheduling for blocks 1380 and 1390 sorted to be an important block may be performed in operation 660 of FIG. 6.

According to an exemplary embodiment, as shown in FIG. 13B, the instructions surrounded by the solid bold lines illustrate a sequence of executing the operation, and the dotted elements 1323, 1333, and 1343 at the right side of each block 1320, 1330, and 1340 may represent an order of cycles in which writeback of operations executed in a third block 1330 and a fourth block 1340 is performed. For example, for each operation, a load3 and a load4 may have a five-cycle latency, and an add3 may have a one-cycle latency. Also, the instructions doubled-up instructions, such as shift2 and load3, illustrate that a WB of the doubled-up instructions occurs in the same cycle.

In particular, as shown in FIG. 13A, a third highest priority block 1380 may be an unimportant block in the absence of an important edge among in-edges of the next priority block 1380. A last priority block 1390 may have an important edge that enters into the last priority block 1390 but not an edge exiting from the last priority block 1390, and a block receiving the corresponding edge may be unscheduled. In this case, since a block next to the last priority block 1390 is unscheduled and it is impossible to consider a particular condition, each operation of the last priority block 1390 may be scheduled similar to an important block, to complete writeback in a BB.

For example, a load3 of the next priority block 1380 may be delivered to the second block 1320 with 2% probability and to the fourth block 1340 with 3% probability based on the edge count shown in FIG. 7. Since a writeback 1323 may occur in the same cycle as a shift2 in the second block 1320 but such a probability is low, a register writeback conflict may be avoided by applying a stall cycle. Here, writeback may occur immediately because an add3 has a one-cycle latency.

Also, since a load4 of the fourth block 1340 has a five-cycle latency, three NOPs may be scheduled to complete writeback of the load4 in a BB as shown in FIG. 13B. Here, writeback of the load3 delivered from the third block 1330 may occur in an NOP cycle, in which writeback fails to be executed, with 3% probability based on the edge count shown in FIG. 7.

According to an exemplary embodiment, when a total number of accesses is 100, the method of FIG. 5 may be performed during 1035 cycles, and the method of FIG. 13 may be performed during a total of 777 cycles including 770 cycles and seven stall cycles. Accordingly, it may result a 24% reduction in execution time, and a 19% reduction in code size since the method of FIG. 5 has twenty six instructions whereas the exemplary embodiment has twenty one instructions.

Figure 14:
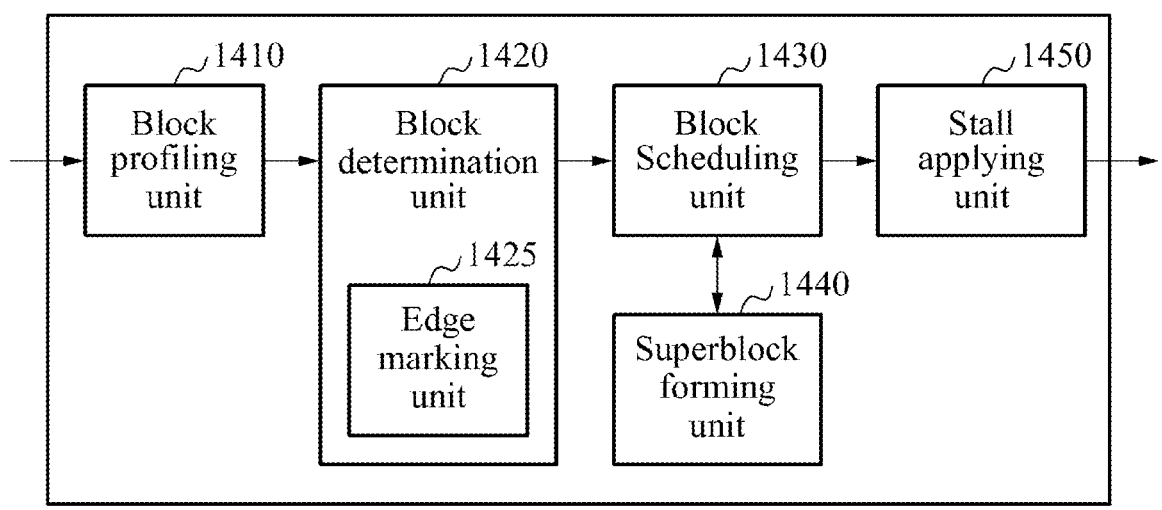
FIG. 14 shows a compiler apparatus for scheduling blocks in a pipeline according to an exemplary embodiment.

According to an exemplary embodiment, as shown in FIG. 14, the compiler apparatus for scheduling blocks in a pipeline may include a block profiling unit 1410, a block determining unit 1420, a block scheduling unit 1430, a superblock forming unit 1440, and a stall applying unit 1450.

The block profiling unit 1410 may profile an access count of a block in a control flow of a program code. Here, the access count of the block may be profiled based on an edge count that may be obtained by a simulation method.

The block determining unit 1420 may determine a block having an access count greater than or equal to a predetermined value to be an important block. Here, the access count may include the edge count. The block determining unit 1420 may include an edge marking unit 1425 to mark an edge having an edge count greater than or equal to a predetermined important limit as an important edge, and to mark an important edge entering from an unscheduled block as a normal edge, and the block determining unit 1420 may determine a block into which an important edge enters, to be an important block.

The block scheduling unit 1430 may schedule an important block based on the access count. The block scheduling unit 1430 may schedule an operation absent executing writeback, in a cycle in which a register writeback conflict is expected in an important block, and when an edge exiting from an unimportant block to an already scheduled block is present, may perform scheduling to execute writeback in the unimportant block.

According to an exemplary embodiment, there is provided a block scheduling unit 1430 which may sort a block and a superblock according to a priority determined based on the access count, and may schedule the block and the superblock sequentially in a sorted order.

The superblock forming unit 1440 may form a superblock from blocks based on the access count. For example, the superblock forming unit 1440 may form a superblock by grouping at least two blocks connected to one another by an edge having a high access count.

The stall applying unit 1450 may apply a stall cycle in a cycle in which a register writeback conflict is expected in an unimportant block.

According to an exemplary embodiment, there is provided a compiling apparatus for scheduling a block in a pipeline may schedule the operations to execute the register writeback across BB boundaries to improve the performance. Also, the compiling apparatus may perform scheduling to prevent stalls in an important block determined based on an edge count as a profiling result to maximize the performance, and may apply a stall cycle to an unimportant block to minimize the code size. Furthermore, the compiling apparatus may schedule the blocks sorted according to a priority determined based on an access count, to prevent back tracking and to minimize a compiling time.

The units described herein may be implemented using hardware components, software components, or a combination thereof. For example, a processing device may be implemented using one or more general-purpose or special purpose computers, such as, for example, a processor, a pipeline processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the exemplary embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A compiling method for scheduling a block in a pipeline, the compiling method comprising:
   profiling, using a processor, an access count of a block in a control flow of a program code;
   determining that the block is an important block, in response to an edge count of an edge entering the block being greater than or equal to a predetermined value, the edge count being included in the access count of the block;
   scheduling the important block in the pipeline using the access count to prevent a register writeback conflict,
   wherein the scheduling of the important block based on the access count to prevent the register writeback conflict comprises scheduling an operation absent executing writeback in a cycle in which the register writeback conflict is expected in the important block;
   wherein determining that the block is the important block comprises forming a superblock from the block based on the access count; and
   scheduling taking no account of writeback in an unimportant block, wherein the scheduling of taking no account of writeback in the unimportant block comprises applying a stall cycle in a physical approach in a cycle in which the register writeback conflict is expected in the unimportant block.

2. The compiling method of claim 1, wherein the determining that the block is the important block comprises:
   marking an edge having an edge count greater than or equal to a predetermined important limit as an important edge; and
   determining a block into which the important edge enters, to be the important block.

3. The compiling method of claim 2, wherein the marking the edge having the edge count greater than or equal to the predetermined important limit as the important edge comprises marking the important edge entering from an unscheduled block as a normal edge.

4. The compiling method of claim 1, wherein the scheduling the important block based on the access count to prevent the register writeback conflict comprises:
   sorting the block according to a priority determined based on the access count; and
   scheduling the block sequentially in an order of sorting the block based on the priority.

5. The compiling method of claim 1, wherein the scheduling the operation absent executing writeback in the cycle in which the register writeback conflict is expected in the important block comprises scheduling a No Operation (NOP) in the cycle in which the register writeback conflict is expected.

6. The compiling method of claim 1, wherein the scheduling the important block based on the access count to prevent the register writeback conflict comprises scheduling a store operation in the cycle in which the register writeback conflict is expected.

7. The compiling method of claim 1, wherein the scheduling the important block based on the access count to prevent the register writeback conflict comprises scheduling an operation of the important block to execute writeback inside the important block or in a block connected to the important block with an edge.

8. The compiling method of claim 1, further comprising: scheduling to execute writeback of an operation in an unimportant block in response to an edge exiting from the unimportant block to an already scheduled block is present.

9. A compiling apparatus for scheduling a block in a pipeline, the compiling apparatus comprising:
   a memory;
   a processor operatively coupled with the memory, the processor configured to:
      profile an access count of a block in a control flow of a program code;
      determine that the block is an important block in response to an edge count of an edge entering the block being greater than or equal to a predetermined value, the edge count being included in the access count;
      schedule the important block in the pipeline based on the access count to prevent a register writeback conflict,
      schedule an operation absent executing writeback in a cycle in which the register writeback conflict is expected in the important block;
      form a superblock from the block based on the access count;
      sort the block and the superblock according to a priority determined based on the access count, and schedule the block and the superblock sequentially in a sorted order; and
      apply a stall cycle in a cycle in which the register writeback conflict is expected to take place in an unimportant block.

10. The compiling apparatus of claim 9, wherein the processor is further configured to:
    mark the edge having the edge count greater than or equal to a predetermined important limit as an important edge in the block, and to mark the important edge entering from an unscheduled block as a normal edge; and
    determine that the block, in which the important edge enters, is the important block.

11. The compiling apparatus of claim 9, wherein the processor is further configured to schedule a writeback execution of an operation in an unimportant block, in response to an edge exiting from the unimportant block to an already scheduled block being present.

12. A non-transitory computer-readable medium comprising a program for instructing a computer to perform a compiling method, the compiling method comprising:
    profiling, using a processor, an access count of a block in a control flow of a program code;
    determining that the block is an important block, in response to an edge count of an edge entering the block being greater than or equal to a predetermined value, the edge count being included in the access count of the block;
    scheduling the important block in the pipeline using the access count to prevent a register writeback conflict,
    wherein the scheduling of the important block using the access count to prevent a register writeback conflict comprises scheduling an operation absent executing writeback in a cycle in which the register writeback conflict is expected in the important block;
    wherein determining that the block is the important block comprises forming a superblock from the block based on the access count; and
    scheduling taking no account of writeback in an unimportant block, wherein the scheduling of taking no account of writeback in the unimportant block comprises applying a stall cycle in a physical approach in a cycle in which the register writeback conflict is expected in the unimportant block.

13. A compiling method of scheduling a block in a pipeline, the compiling method comprising:
- determining, using a processor, that the block is an important block, in response to an edge count of an edge entering the block being greater than or equal to a predetermined value, the edge count being included in the access count of the block;
- scheduling, in response to determining that the block is the important block using the access count, the block so as to prevent the block from causing a register writeback conflict,
- wherein the scheduling of the important block in the pipeline using the access count to prevent a register writeback conflict comprises scheduling an operation absent executing writeback in a cycle in which the register writeback conflict is expected in the important block;
- wherein determining that the block is the important block comprises forming a superblock from the block based on the access count; and
- scheduling taking no account of writeback in the unimportant block, wherein the scheduling of taking no account of writeback in the unimportant block comprises applying a stall cycle in a physical approach in a cycle in which the register writeback conflict is expected in the unimportant block.

14. The compiling method of claim 13, wherein the access count of the block is a ratio of a number of uses of the block to a total number of accesses of a compiled program code as a result of simulating at least one operation instruction.

15. The compiling method of claim 13, further comprising:
- scheduling, in response to determining that the block is an unimportant block, the block so as to permit the block to cause a register writeback conflict.

16. The compiling method of claim 15, further comprising:
- determining, in response to scheduling the block so as to permit the block to cause a register writeback conflict, whether the block is expected to cause a register writeback conflict, and in response to determining that the block is expected to cause the register writeback conflict, applying the stall cycle.

17. A compiling apparatus for scheduling a block in a pipeline, the compiling apparatus comprising:
- a memory;
- a processor operatively coupled with the memory, the processor configured to:
  - determine whether the block is important or unimportant by comparing an edge count of an edge entering the block with a predetermined value;
  - schedule the block in the pipeline so that in response to the block being important, the block is scheduled so as to prevent the block from causing a register writeback conflict, and in response to the block being unimportant, the block is scheduled so as to permit the block to cause a register writeback conflict,
- wherein the processor is further configured to schedule an operation absent executing writeback in a cycle in which the register writeback conflict is expected in the important block;
- wherein determining that the block is the important block comprises forming a superblock from the block based on the access count; and
- scheduling taking no account of writeback in the unimportant block, wherein the scheduling of taking no account of writeback in the unimportant block comprises applying a stall cycle in a physical approach in a cycle in which the register writeback conflict is expected in the unimportant block.

18. The compiling apparatus of claim 17, wherein the processor is further configured to:
- determine, in response to the block being unimportant, whether the block is expected to cause the register writeback conflict; and
- in response to determining that the block is expected to cause the register writeback conflict, apply the stall cycle in a cycle in which the register writeback conflict is expected.

* * * * *